Sept. 24, 1946.  G. C. ARMSTRONG  2,408,185
ROTOR TYPE CONTACTOR
Filed Feb. 19, 1944  2 Sheets—Sheet 2
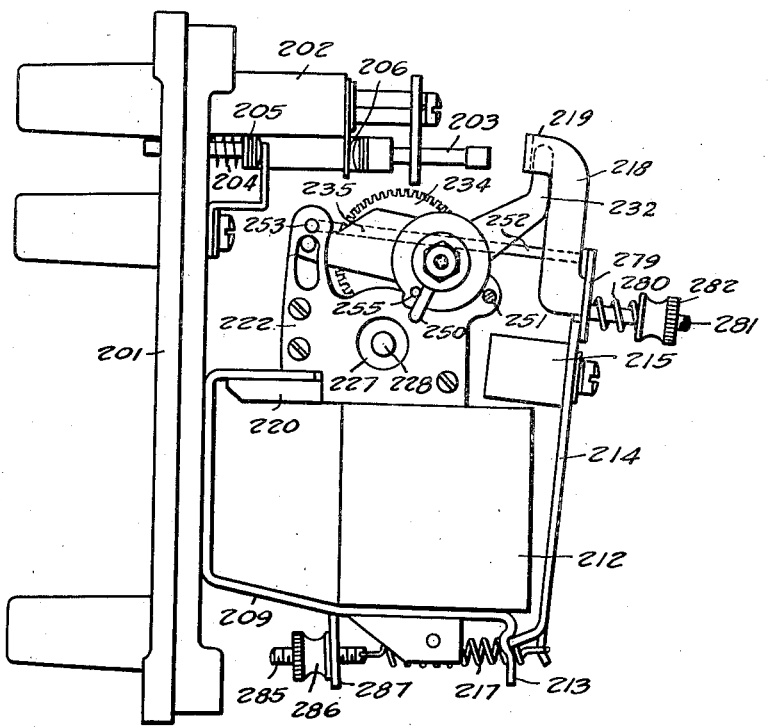
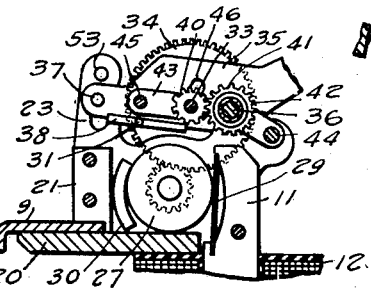
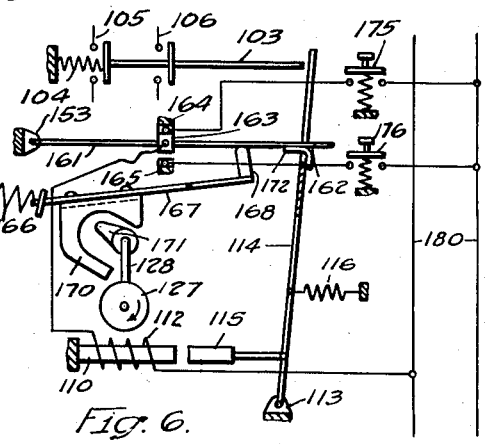
WITNESSES:
INVENTOR
George C. Armstrong.
BY
Paul E. Friedemann
ATTORNEY Patented Sept. 24, 1946

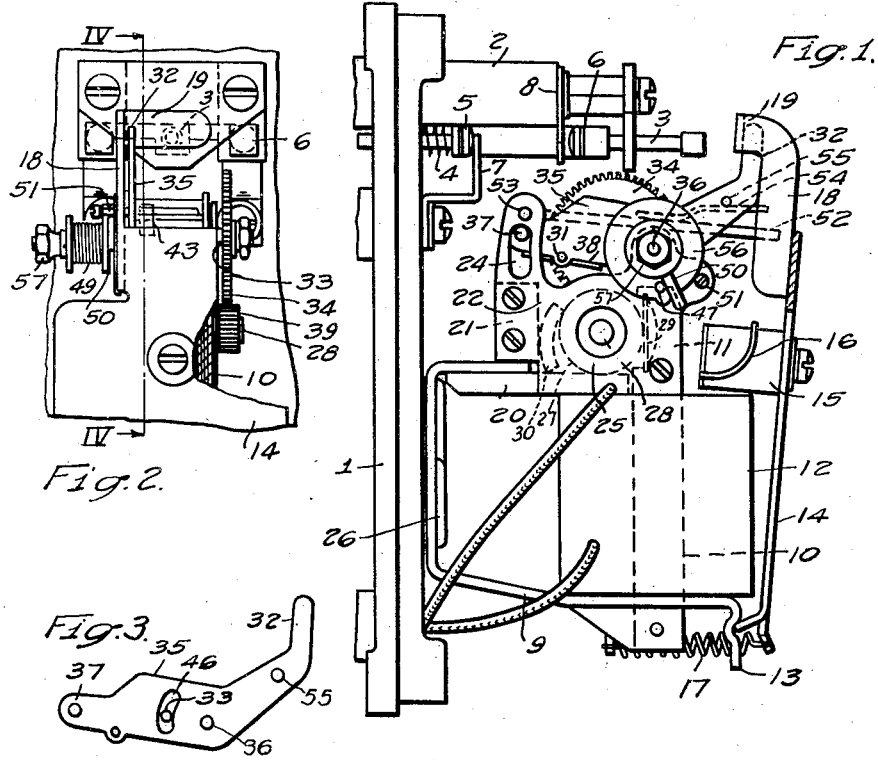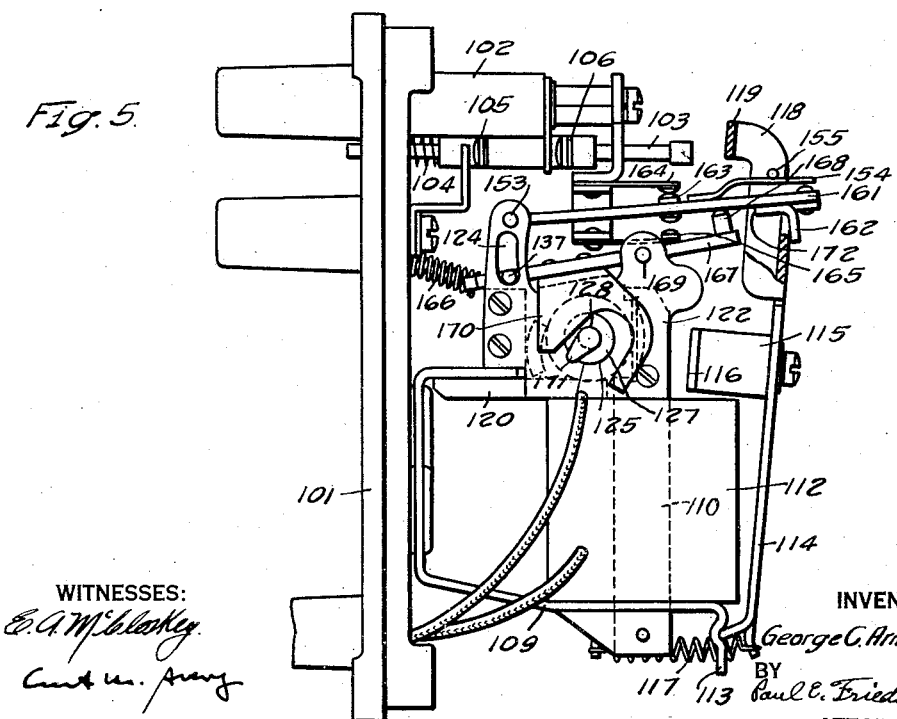

2,408,185

UNITED STATES PATENT OFFICE 2,408,185

ROTOR TYPE CONTACTOR

George C. Armstrong, Forest Hills, Pa., assignor to Westinghouse Electric Corporation, East Pittsburgh, Pa., a corporation of Pennsylvania Application February 19, 1944, Serial No. 523,059

16 Claims. (Cl. 200—97)

1

My invention relates to electromagnetic rotary devices and, in particular, to time limit relays of the type dealt with in my Patents Nos. 2,111,550; 2,111,541; 2,111,542; and 2,111,543; and in my copending application Serial No. 520,191, filed January 29, 1944, on Timing devices.

According to my patents, a rotary motion of a driving or timing device is obtained by means of a magnetizable rotor which is subjected to periodic magnetic flux in magnetic and frictional engagement with the poles of a magnet structure while permitted to contact one of the magnet poles and biased away from the other against the attracting force of the latter. It is also shown in some of these patents that such a rotor can be used in a timing device in such a manner that the operation of a pivotally mounted magnet armature is prevented until the rotor has moved through a given rotary travel.

It is an object of my invention to improve motor or timing devices of the above-mentioned type so as to obtain a substantially vibration-free or noiseless operation in cases where the device remains energized by periodic or alternating current after the rotor has gone through the cycle of its driving or timing function.

Another object of the invention, relating to timing devices especially, is to devise a rotor type relay of a uniform and accurately adjustable timing period.

It is also intended by this invention to provide a relay of the kind above referred to in which the rotor causes successively the actuation and latching of a contact and the subsequent unlatching and return of the contact upon successive energization of the relay. An object, subsidiary to the one last mentioned, is the design of such a relay so that the rotor remains operative after each energization only as long as its rotation is needed for performing the contact operation then desired.

Still another object of my invention aims at devising a rotor type drive on the principle here involved for actuating a toggle joint or the like snap mechanism in both directions of snap action while employing a single rotor of unidirectional rotation.

A further object of the invention is to provide a delayed action relay for overload protection, for instance of synchronous motors, which achieves the desired delay in dependence upon the overload condition to be controlled while eliminating the thermostatic means heretofore applied in such cases. An object, allied to the last foregoing, is to render a protective delayed action relay

2 insensitive to changes in ambient temperature without requiring the use of thermostatic or other compensating means extraneous to the relay operation proper. Also in conjunction with the foregoing, it is aimed at providing an overload relay, such as for the protection of damper windings of synchronous motors, whose operation depends on the frequency of the energizing relay current so that its timing period decreases with increasing current frequency.

An object is further to provide a timing relay in accordance with one or several of the above-stated aims whose timing function is achieved by electromagnetic means, permitting the relay to be used in air as well as immersed in oil or other insulating liquid.

These and other objects will be apparent from the following description of the embodiments illustrated in the drawings, in which:

Figure 1 shows a side view of a timing relay designed in accordance with my invention;

Fig. 2 is a partial front view of the same relay, omitting some of the apparatus parts for the sake of clarity;

Fig. 3 shows a lever which forms part of the same relay; and

Fig. 4 is a partial sectional view of the vibratory rotor and gear mechanism of the relay, the section being taken along the vertical plane denoted in Fig. 2 by the dot-and-dash line marked IV—IV;

Fig. 5 is a lateral view of another relay also embodying the invention but designed as a latched-in relay to be controlled by successive current impulses in order to produce an alternate opening and closing of contacts;

Fig. 6 is a schematic showing of the relay according to Fig. 5 in conjunction with an operating circuit for controlling the relay operation;

Fig. 7 represents a third embodiment by a lateral view largely similar to Fig. 1, this embodiment being designed as a protective relay, for instance for overload response or for protection of damper windings during the starting period of synchronous motors.

Referring to the timing relay, as represented in Figs. 1 through 4, the numeral 1 denotes an insulating base to be mounted on a panel, wall or the like support. The base 1 has a raised portion 2 which serves as a support and guidance for a reciprocable plunger 3 which is biased by a helical compression spring 4 so as to be normally held in the position shown in Fig. 1. The plunger 3 is provided with two contacts 5 and 6 which cooperate with stationary contacts 7 and 8, respectively. In the illustrated position of plunger 3, the electric contact between elements 5 and 7 is closed while that between elements 6 and 8 is open. Upon movement of plunger 3 towards the left, contact elements 5 and 7 are separated while the contact between elements 6 and 8 is closed.

The magnetically operated timing device for actuating the plunger contains a stationary frame 9 of magnetizable material which is mounted on the base 1, a vibration damping insert 26 being preferably interposed, and carries a laminated magnet core 10 extending substantially in the vertical direction. Core 10, when energized, forms a magnet pole at its lower end and another pole at its upper end 11. A magnet coil 12 is mounted on the core 10 and designed for energization by periodically variable current, preferably alternating current, for instance of 60 cycles per second. The frame 9 has a lug 13 which forms a pivot for a magnet armature 14. This armature carries a laminated armature body 15 for attraction by pole 11 of core 10. The body 15 is provided with a shading coil 16 in order to assure a continuous attraction and hence a silent operation during the alternating energization of the magnet structure. A helical extension spring 17 is at one end connected to the frame 9, while its other end is attached to the armature 14. This spring biases the armature towards the illustrated inoperative position. The end portion 18 of the armature structure has an angular lug 19 so located so as to engage the top of the contact plunger 3 when the armature moves towards the magnet pole 11.

The frame 9 is provided with a pole plate 20 and an adjacent extension 21 which are both located at the end of the frame opposite to the lug 13 and magnetically spaced from the pole 11. Due to this construction, a main magnetic gap exists between pole 11 and the armature body 15 (Fig. 1), while a second or stray field exists between pole plate 20 and pole 11 (Fig. 4) during the active periods of the energizing coil 12. As long as the armature 14 is in the illustrated inoperative position and hence the air gap between pole 11 and armature body 15 relatively large (Fig. 1) the field strength in this main gap is relatively low and hence the field strength in the stray gap between pole plate 20 and pole 11 is relatively large. However, when the armature body 15 has moved towards the core 10 and seals against the pole 11, almost the entire magnetic flux of core 10 passes directly from pole 11 to the armature body 15 so that the field strength in the stray field between pole plate 20 and pole 11 is greatly reduced or virtually zero.

Two cheek plates 22 (Fig. 1) and 23 (Fig. 4) of non-magnetic material, such as brass, are mounted on the pole 11 and the pole extension 21 of frame 9 so as to extend in parallel to each other. The cheek plate 22 has a slot 24, and each cheek plate is provided with an opening as denoted by numeral 25 in Fig. 1. A rotor 27 is arranged between the two cheek plates and between the pole 11 and the pole extension 21 (Fig. 4). The shaft or shaft pins 28 of the rotor 27 extend through the openings 25 (Fig. 1), but these openings are large enough to permit the respective shaft pins 28 a free translating motion towards and away from pole 11. A leaf spring 29 is mounted across a hollowed portion of the magnet pole 11 and imposes a biasing force on the rotor 27 when the latter is attracted towards the magnet pole 11. A lubricating body 30 of porous material, for instance felt, which is soaked with a lubricant is mounted between the cheek plates at the side of the rotor 27 opposite to the leaf springs 29. The provision of such a lubricating means insures a uniform timing period of the relay. Only a slight oil film on the peripheral surface of the rotor is required for this purpose.

The rotor 27 consists preferably of magnetizable stainless steel, or has at least a surface layer of stainless material, and its peripheral surface is polished. The pole plate 20 of the magnet frame 9 consists preferably also of stainless steel and has a polished surface for engagement by the rotor 27.

When the energizing coil 12 is supplied with alternating current, a period magnetic flux is produced in the magnetic structure and reverses its direction at the frequency of the energizing current. As long as the air-gap between the pole 11 and the armature body 15 is kept open, and this is done by latch means to be described in a later place, an alternating magnetic field is produced between the pole plate 20 and the pole 11. This alternating flux traverses the rotor 27. As a result, the rotor is attracted by the pole plate 20 and hence in frictional engagement therewith while being also attracted towards the pole 11 until it abuts against the spring 29 (Fig. 4). Under the influence of the periodic flux and of the spring 29, the cylinder 27 will both move to and fro and rotate. At the beginning of the movement, various transients occur, but when the motion has become steady, the rotor will be in its extreme left-hand position at the time the flux is exerting the greatest pull. This is in accordance with the usual action of bodies oscillating steadily. The reversal of motion occurs at the time of greatest force, because it is the time of greatest acceleration.

As the rotor 27 moves from its extreme left-hand position, friction between it and the pole plate 20 causes it to roll. It will reach the extreme right-hand position at or about the time that the flux in the rotor air gap falls to zero. This will be the moment of reversal of flux in the core 10 (Fig. 1), but it will not be the time of reversal of flux in the rotor cylinder 27 (Fig. 4) because the hysteresis of its material requires that the flux in the gap shall reverse and then rise to a sufficient intensity to provide the coercive force needed to overcome the remanence of the cylinder 41 before the polarity of its magnetism will reverse.

At the moment after reversal of flux in the gap the pole plate 20 and the adjacent portions of the cylinder 27 will be of the same polarity. Therefore, some repulsion will occur between them. Consequently, the cylinder 27 will move under the influence of the spring 29 without being caused to roll. That is, it will slide toward the left during at least part of the time it is moved by the spring. During the preceding rolling motion toward the right, the cylinder will have acquired a certain rotational momentum. This will cause its rotation to persist during the sliding motion toward the left until the magnetism of the rotor has been reversed and there is again attraction between the rotor and the pole plate 20. The friction resulting from this attraction must first overcome the rotational momentum before it can reverse the direction of rotation of the cylinder.

The cylinder arrives at its left-hand position with no rotation at that instant or with a rotation smaller than and in the opposite sense to that it possessed when reaching the extreme right-hand position. The result is an accumulation of rotational motion in the clockwise direction.

This motion is transmitted by a releasable gear to a latch mechanism which controls the operation of the armature 14 and hence the actuation of the above-mentioned relay contacts. The gear and latch mechanism comprises a lever 35 fulcrumed about a pin 36 which extends between the two cheek plates 22 and 23 (Figs. 1, 3, 4). A stop pin 37 attached to lever 35 engages the slot 24 of cheek plate 22 in order to limit the angular motion of the lever about its fulcrum pin 36 (Figs. 1, 3, and 4). The lever 35 as well as the gears and pins appertaining thereto consist of non-magnetic material with the exception of a magnetizable plate 38 which is pivotally mounted at 31 (Figs. 1, 3, and 4). This plate 38 bridges the rotor 27 and the pole extension 21 magnetically when the lever 35 is moved, counterclockwise about pin 36, towards the rotor. (See Fig. 4). As a result, an essential part of the magnetic stray flux passes from the pole extension 21 through plate 38 into the rotor 27 rather than from the pole plate 20 to the rotor. This balances the magnetic effect between the pole plate 20 and the rotor and prevents the above-described oscillatory and rotary motion. Consequently, when the magnetizable plate 38 is in engagement with the rotor, its rotation is either stopped or decreased to such an extent as to insure a full stop in coaction with the above-explained reduction of the stray field upon sealing of armature body 15 against pole 11.

Lever 35 has an arcuate slot 46 extending about the axis of the fulcrum pin 36. A bearing pin 33 extends through the slot 46 and carries a spur gear 34 for engaging a pinion 39 mounted on one of the shaft pins 28 of the rotor 27 (Fig. 2). This meshing engagement exists only when the lever structure 35 is in the lowered position but is opened when lever 35 is raised so that the stop pin 37 abuts against the upper end of slot 24, as is illustrated in Fig. 1. A pinion 40 is firmly mounted on the shaft pin 33 of the spur gear 34 and meshes with a gear 41 firmly secured to the fulcrum shaft 36 of the lever structure. This fulcrum shaft carries also a cam 42 and a cradle consisting of two cradle bars 43 of which only one is shown in Fig. 4. The two cradle bars are held together by connecting pins 44 and 45 and are rotatable about the fulcrum shaft 36. Consequently, the pinion 40 and the gear 41 are always in meshing engagement with each other while the pinion shaft 33 with its spur gear 34 is shifted into and out of engagement with the rotor pinion 39.

An extension 32 of lever 35 (Figs. 1, 2, 3) engages the lug portion 19 of the armature 14. Due to this engagement, the lever 35 is maintained in the position shown in Fig. 1, in which the spur gear 34 is disengaged from the rotor pinion, as long as the armature 14 is in its inoperative position. When the armature is moved towards the magnet, the extension 32 and hence the lever 35 will follow and thus move the spur gear 34 counterclockwise about the fulcrum shaft 36 into engagement with the rotor.

A latch arm 52 is pivoted at 53 to the cheek plates 22 and 23. Under the bias of its weight, the latch arm tends to assume the position shown in Fig. 1 where it lies in the path of the armature 14 and prevents the armature from actuating the contact plunger 3. A leaf spring 54 attached at one end to the latch lever 52 and resting with its other end against a stop pin 55 of lever 35 exerts also a bias on the latch arm towards the illustrated latching position (Fig. 1) and imposes also a bias on the lever 35 tending to move the lever and spur gear 34 towards engagement with the rotor pinion. The weight of the lever and gear assembly increases this bias. The latch arm 52 is so located relative to the cam 42 (Fig. 4) that it is entrained thereby and moved against the just-mentioned bias into the unlatching position when cam 42 reaches the end of its rotational travel.

The cam shaft 36 is under the biasing force of a return spring 49 (Fig. 2). This spring is effective between a stop 50 firmly secured to the fulcrum shaft 36 and a stationary calibrating plate 56 (Fig. 1). As a result, the return spring has the tendency to hold pin 50 against a stop 47 of the calibrating disk 56. The angular position of the calibrating disk 56 and hence of its stop 47 can be changed upon loosening a lock nut 57. When the spur gear 34 is driven by the rotor pinion, the fulcrum shaft 36 with its cam 42 (Fig. 4) and stop pin 50 (Fig. 1) is rotated in the counterclockwise direction until the latch arm 52 is released and the pin 50 stopped by its abutment against a stationary stop 51. Consequently, the amount of angular cam travel necessary for releasing the latch 52 and, therefore, the timing period of the relay are dependent upon the selected angular adjustment of the calibrating disk 56. As a result, the timing period of the relay can be varied at will within wide limits.

Reviewing the operation of the timing relay as a whole, let us assume that the coil 12 is deenergized so that the parts of the relay mechanism assume the position illustrated in Fig. 1. Due to the bias effected by springs 17 and due to the bias acting on the lever 35 and the latch arm 52, the cam 36 assumes a starting position which corresponds to the angular adjustment of the calibrating disk 56 and its pin 47.

Upon energization of the coil 12, the alternating magnetic flux causes the armature body 15 to be attracted by the pole 11 of the magnetic core 10. The armature 14 performs an initial motion towards the magnet and thereby permits the lever 35 to turn counterclockwise so that spur gear 34 meshes with the rotor pinion 39. This initial motion of the armature is limited by its engagement with the latch arm 52. Consequently, a relatively large air gap remains between the magnet pole 11 and the armature body 15, causing a sufficiently intensive stray field to remain active between the pole plate 20 and the pole 11. Due to this stray field, the rotor performs its operation as described previously and causes the gear train to rotate the cam 42 towards the latch arm 52. During this operation, the lever 35 is in an intermediate position where the magnetizable plate 38 is still out of engagement with the rotor. At the end of its travel, the cam 42 raises the latch arm 52 out of engagement with the armature lever 14. The armature body 15 is now moved into sealing engagement with the core 11. This establishes the above-described magnetic shunt path which reduces the stray field. At the same time, the motion of the armature structure permits the lever 35 to drop, bringing its plate 38 into magnetic engagement with the rotor and the pole extension 21. As a result, the oscillation and rotation of the rotor 27 is stopped regardless of the continuing energization of the relay coil 12. The armature motion, upon release of the latch arm 52, causes the armature lug 19 to push the contact plunger 3 towards the base 1, thereby actuating the relay contacts.

Upon deenergization of the relay, the armature structure and the lever 35 are moved into the original position due to the action of spring 17, while the cam 42 is returned to its original position by spring 49. Hence, the relay resumes automatically its starting position.

The relay illustrated in Figs. 5 and 6 is provided with a snap-action mechanism and designed for operation by temporary control impulses, such as are obtained in control circuits with push-button operation. The purpose of this relay is to close a circuit when temporarily energized and to maintain the circuit closed until a second control impulse is effective.

The stationary magnet structure, the rotor mechanism proper, the magnet armature, and the contact elements of this relay are largely similar to the corresponding parts of the above-described relay according to Figs. 1 through 4. In order to indicate this similarity and for facilitating a comparison of the two relays, the last two digits of the reference numerals in Figs. 5 and 6 are identical with the numerals applied to Figs. 1 through 4, wherever functionally or structurally similar elements are concerned.

The insulating base plate 101 of the latched-in relay according to Fig. 5 is provided with a raised portion 102 which accommodates a reciprocable plunger 103 and an appertaining return spring 104 for actuating the movable contacts 105 and 106 of the relay, both contacts being open when the plunger 103 is in the illustrated position. A magnetizable frame 109 is mounted on the base 101 and carries a magnet core surrounded by an alternating-current coil 112. A lug 113 of frame 109 forms a pivot bearing for the armature 114 which carries a laminated armature body 115. The pole surface of this armature body is covered by a non-magnetic shim 116 so that when the armature body is fully attracted by the magnet core, a non-magnetic gap is maintained. As a result, the stray field effective between the magnetic core and the pole plate 120 remains always of sufficient strength to rotate the rotor 127 in the manner described previously in conjunction with the embodiment of Figs. 1 through 4.

The armature 114 has at its peripheral end 118 an angularly projecting lug 119 for cooperation with plunger 103. That is, when the armature is moved into contact with the magnet core, the plunger 103 is displaced in opposition to its spring 104 and closes both contacts at 105 and 106.

The magnet structure is provided with two non-magnetic cheek plates, of which only the cheek plate 122 is visible in Fig. 5. A latch arm 161 of insulating material is pivoted at 153 to the cheek plates. The arm 161 carries an angular latch member 162 which in the illustrated position limits the opening motion of the armature. A movable transfer contact 163 is mounted on the insulating arm 161 for alternating cooperation with stationary transfer contacts 164 and 165. A leaf spring 154 attached to arm 161 and slidably abutting against a pin 155 of the armature portion 118 tends to move the arm 161 into latching engagement with the armature. This tendency is in addition to the bias effected by the weight of the latch arm.

A snap-action mechanism consisting of a toggle joint serves for controlling the latch structure. The toggle joint is composed of a spring member 166 and a toggle arm 167 which has a lug 168 for engaging the latch arm 161. The toggle arm 167 is pivoted at 169 to the cheek plates 122 and carries a pin 137 in engagement with a slot 124 of cheek plate 122 in order to limit the angular snap motion of the mechanism. A cam 170 is firmly secured to the toggle arm 167. The rotor 127, whose shaft pin 128 extends through an opening 125 of the cheek plate 122, is provided with a crank arm 171 for cooperation with two opposite cam surfaces formed by the cam member 170.

The design and operation of the rotor 127 and the appertaining pole members and leaf spring of the stationary magnet structure are similar to those illustrated and described in conjunction with the embodiment of Figs. 1 through 4.

Starting from the position of the relay parts illustrated in Fig. 5, the relay is actuated by imposing a temporary control impulse on the relay coil 112, this impulse comprising a series of alternating-current cycles sufficient to turn the rotor at least a half rotation. Upon receipt of such an impulse, the crank 171 will rotate clockwise and engage the upper cam surface of the cam element 170, thereby rotating the toggle arm 167 until the toggle joint passes through its dead-center position. Then, the joint will snap until its motion is stopped by pin 137 in slot 124. Concurrent with the rotation of the rotor 127, the armature body 115 is attracted by the magnet core so that the shim plate 116 contacts the magnet core. This motion forces plunger 103 into contact closing position, but due to the presence of the shim plate does not stop the rotor 127. Upon the closure of the plunger contacts, the snap action of the toggle joint will permit the latch arm 161 to drop under the bias of its weight and the additional effect of spring 154. As a result, the latch surface 172 of the angular latch member 162 will catch over the armature 114 and lock it in the contact closing position. Hence, upon cessation of the control impulse, the armature and contacts will remain in the closing position. The just-mentioned snap motion has also the effect of separating the transfer contact 163 from the stationary contact 164 and placing it in engagement with the stationary contact 165. This has the effect of terminating the impulse and stopping the rotor 127, as will be understood from the following description of the control circuit exemplified in Fig. 6.

Fig. 6 shows schematically several parts of the same relay. The main contacts 105 and 106 are connected with the circuit to be controlled. The transfer contacts 163, 164, and 165 actuated by the latch arm 161 are connected with an alternating-current circuit 180 through push buttons 175 and 176. In the illustrated position, the main contacts 105 and 106 are open while the transfer contact 163 engages the stationary contact 164 in accordance with Fig. 5. In order to close the main circuit of contacts 105 and 106 push button 175 is depressed by the attendant. This establishes an energizing circuit for relay coil 112 through button 175 and contacts 164 and 163. As a result, the rotor 127 revolves clockwise until its crank 171 causes the cam member 170 to actuate the toggle joint mechanism. At the beginning of this operation, the armature body 115 is attracted by the magnet core 110 and forces the plunger 103 against spring 104 to close the main contacts 105 and 106. As explained, the latch surface 172 is now placed in locking engagement with the armature 114 in order to maintain the main contacts in closed position upon the cessation of the control impulse. At the same time, the coil circuit between contacts 163 and 164 is interrupted so that the rotor 127 is stopped upon turning approximately a half rotation. In order to open the main contacts, the push button 176 is depressed. This closes the circuit of coil 110 through contacts 163 and 165 and causes the rotor 127 to perform another approximate half rotation until the snap mechanism returns the latch arm 161 into the illustrated original position, and thereby interrupts the coil circuit. The apparatus is then in the initial condition represented in Figs. 5 and 6.

The embodiment shown in Fig. 7 is designed as a protective relay for safeguarding electric apparatus and machines from overloads. Essential parts of this relay are similar to those of the relay according to Figs. 1 through 4, this similarity being indicated for the purpose of comparison by using reference numerals in Fig. 5 whose last two digits correspond to the respective numerals of Fig. 1 wherever similar elements are concerned.

The base 201 of the relay according to Fig. 7 carries on its raised portion 202, a plunger 203 biased by a spring 204 for actuating the relay contacts 205 and 206. The magnetic frame 209 which at 213 forms a pivot for the armature 214 and its laminated armature body 215 carries a pole plate 220 for coaction with a rotor 227 whose shaft pin 223 carries a pinion for actuating a spur gear 234, which, in turn, controls a cam for releasing a latch arm 252 pivoted at 253 to a cheek plate 222. While the just-mentioned elements of the relay are substantially the same as those of the first-mentioned embodiment, the relay according to Fig. 7 is provided with a return spring 217 whose tension can be adjusted within relatively wide limits by means of an adjusting screw 285 which is actuated by a nut 286 resting against a lug 287 formed by the frame 209. The nut 286 permits adjusting the maximum operating current to be carried continuously by the relay coil 212 without causing an actuation of the relay. In other words, the strength of spring 217 is so adjusted that a selected rated current may pass through the coil without overcoming the biasing force of the spring. Hence, the relay will operate only when the rated current is exceeded.

In further distinction from the first-mentioned embodiment, a plate portion 279 of the armature structure is pivotally movable relative to the integral armature portions 214, 218 and 219, and is held in face-to-face engagement with portion 214 by means of a spring 280. This spring is mounted on a pin 281 and its compression can be adjusted by a nut 282 in order to permit a selection of the instantaneous overload current under which the relay is supposed to be actuated irrespective of the latching engagement of the latch arm 252 with the armature portion 279. That is, when an overload occurs, the rotor operated latch mechanism is usually operative in order to actuate the relay contacts only after the elapse of the timing period of the relay. However, if the overload assumes an excessive magnitude, for instance in a short-circuit, the relay is supposed to respond immediately. This is achieved by the fact that the latch arm 252 engages the plate 279 rather than the main armature 214. Hence, if the overload exceeds the value adjusted by means of the nut 282, the attraction of the armature body 215 is strong enough to overcome the force of spring 280 and to move the armature towards plunger 203 under compression of the spring, thereby actuating the contacts without retardation.

Since a relay of this type is usually employed for controlling a separate contactor so that the latter opens the circuit when the overload relay responds to undesired current conditions, the illustrated relay does not remain energized for a greater length of time. For that reason, the armature body 215 need not be provided with a shading coil, and it is usually also unnecessary to provide the gear lever 235 with a magnetic shunt plate similar to the plate 38 shown in Fig. 1. For the same reason, no provisions need be made for a silent operation of a mechanism, and the frame 209 may be mounted directly on the base 201 without interposing noise dampening cushioning means.

A relay of the type described is also favorable for the protection of damper windings of synchronous motors. It is known to apply for this particular purpose a thermal overload relay connected in series with the field discharge resistor of the synchronous motor during the starting operation, the heater of the overload relay being shunted by a saturating reactor. At the high frequency induced in the motor field at standstill, the field current passes through the heater, while when the motor approaches synchronous speed and hence induces a current of lower frequency in the field winding, most of this current is carried by the saturable inductive shunt. In these known relays, the heater must be subjected to extremely high temperatures in order to trip the relay quickly enough to afford the desired protection. In may cases, however, the required period of response is so short that the thermal device cannot follow with sufficient speed. If the load is such that the motor cannot come up to synchronous speed, the inductive shunt may be overheated unless the motor is disconnected by other protective devices. A relay of the type described in the foregoing avoids these difficulties and drawbacks of the known arrangement. The operation and angular speed of the rotor are dependent on the frequency of the excitation applied to the voltage coil of the relay. Hence, the relay is responsive to the high frequency induced in the field of the synchronous motor at standstill but does not respond to the low frequency induced in the field as the motor comes up to speed. The relay has the further advantage of being relatively small and inexpensive, of widely variable timing period, and capable of carrying the induced current without question of thermal ability.

The variety of the above-described embodiments of my invention shows that it will be obvious to those skilled in the art to devise other modifications of my invention without departing from its gist and objectives. I, therefore, wish this specification to be understood as illustrative rather than in a limiting sense.

I claim as my invention:

1. An electromagnetic device comprising, in combination, a magnetic structure having two pairs of pole surfaces forming two respective air gaps and containing a coil for producing periodic magnetic flux in said gaps, a magnetizable rotor disposed in one of said gaps adjacent one of the appertaining pole surfaces to roll relative thereto and being movable towards said appertaining other pole surface for attraction thereby and biased away from said latter surface so as to perform unidirectional rotation when said coil is energized, an armature disposed in said other gap for attraction by said structure so as to shunt said first gap when in attracted position in order to thereby stop the rotation of said rotor, and means disposed between said rotor and said armature for preventing said armature to move into said position, said means being controlled by said rotor so as to become ineffective upon rotation of said rotor through a given angle.

2. An electromagnetic device comprising, in combination, a mangetic structure having two pairs of pole surfaces forming a stray gap and a main gap magnetically in parallel to each other, a coil on said structure for producing periodic magnetic flux in said gaps, a magnetizable rotor disposed in said stray gap adjacent to one of the appertaining pole surfaces to roll relative thereto and being movable towards said appertaining other pole surface for attraction thereby and biased away from said latter surface so as to perform unidirectional rotation when said coil is energized, an armature disposed in said main gap for attraction by said structure so as to magnetically shunt said stray gap when in attracted position in order to thereby stop the rotation of said rotor, and means disposed between said rotor and said armature for preventing said armature to move into said position, said means being controlled by said rotor so as to become ineffective upon rotation of said rotor through a given angle.

3. A timing relay comprising, in combination, a magnetic structure having two pairs of pole surfaces forming a stray gap and a main gap magnetically in parallel to each other, a coil on said structure for producing periodic magnetic flux in said gaps, a magnetizable rotor disposed in said stray gap adjacent to one of the appertaining pole surfaces to roll relative thereto and being movable towards said appertaining other pole surface for attraction thereby and biased away from said latter surface so as to perform unidirectional rotation when said coil is energized, an armature disposed in said main gap for attraction by said structure so as to magnetically shunt said stray gap when in attracted position in order to thereby stop the rotation of said rotor, and means disposed between said rotor and said armature for preventing said armature to move into said position, said means being controlled by said rotor so as to become ineffective upon rotation of said rotor through a given angle, and contact means connected with said armature to be operated thereby when moving into said position.

4. A timing device comprising, in combination, a magnetic structure having two pairs of pole surfaces forming two respective air gaps and containing a coil for producing periodic magnetic flux in said gaps, a magnetizable rotor disposed in one of said gaps adjacent one of the appertaining pole surfaces to roll relative thereto and being movable towards said appertaining other pole surface for attraction thereby and biased away from said latter surface so as to perform unidirectional rotation when said coil is energized, an armature disposed in said other gap for attraction by said structure so as to shunt said first gap when in attracted position in order to thereby stop the rotation of said rotor, and means disposed between said rotor and said armature for preventing said armature to move into said position, said means being controlled by said rotor so as to become ineffective upon rotation of said rotor through a given angle, and a magnetizable body movably arranged in proximity to said first gap and controlled by said armature so as to magnetically bridge said rotor and one of said appertaining poles when said armature moves into said position.

5. An electromagnetic device comprising, in combination, a magnetic structure having an air gap between two poles and an energizing coil for producing alternating flux in said gap, a magnetizable rotor disposed in said gap adjacent one of said poles to roll relative thereto when attracted thereby and in engagement therewith, said rotor being movable towards each other pole for attraction thereby, means for biasing said rotor away from said other pole so as to cause unidirectional rotation of said rotor when said coil is energized, a magnetizable body movably arranged in proximity to said gap for magnetically bridging said rotor and one of said poles to stop said rotation when moved into operative position, and means controlled by said rotor for moving said body into said position upon a given rotary travel of said rotor.

6. An electromagnetic device comprising, in combination, a magnetic structure having an air gap between two poles and an energizing coil for producing alternating flux in said gap, a magnetizable rotor disposed in said gap adjacent one of said poles to roll relative thereto when attracted thereby and in engagement therewith, said rotor being movable towards said other pole for attraction thereby, means for biasing said rotor away from said other pole so as to cause unidirectional rotation of said rotor when said coil is energized, a magnetizable body movable relative to said structure for reducing said flux in said gap when moved into operative position, and means controlled by said rotor for moving said body into said position upon a given rotary travel of said rotor.

7. An electromagnetic device comprising, in combination, a magnetic structure having an air gap between two poles and an energizing coil for producing alternating flux in said gap, a magnetizable rotor disposed in said gap adjacent one of said poles to roll relative thereto when attracted thereby and in engagement therewith, said rotor being movable towards said other pole for attraction thereby, means for biasing said rotor away from said other pole so as to cause unidirectional rotation of said rotor when said coil is energized, and a lubricant-carrying porous body arranged in contact with said rotor at its peripheral surface substantially opposite to said biasing means.

8. A timing device comprising, in combination, a magnetic structure having two poles forming an air gap and containing energizing means for producing periodic magnetic flux in said gap, a magnetizable rotor disposed in said gap adjacent one of said poles to roll relative thereto and being movable towards said other pole for attraction thereby, means for biasing said rotor away from said other pole so as to cause unidirectional rotation of said rotor when said means are energized, a snap action contact mechanism movable between two positions, and transmission means disposed between said rotor and said mechanism for actuating the latter in opposite directions by subsequent rotations of said rotor.

9. A timing device comprising, in combination, a magnetic structure having two poles forming an air gap and containing energizing means for producing periodic magnetic flux in said gap, a magnetizable rotor disposed in said gap adjacent one of said poles to roll relative thereto and being movable towards said other pole for attraction thereby, means for biasing said rotor away from said other pole so as to cause unidirectional rotation of said rotor when said means are energized, a snap action contact mechanism movable between two positions, and controlled by said rotor to be actuated alternately in opposite directions by subsequent rotations of said rotor, and contacts actuated by said mechanism for controlling said energizing means so as to interrupt their energization upon each actuation of said mechanism.

10. An electromagnetic device comprising, in combination, a magnetic structure having an air gap between two poles and an energizing coil for producing alternating flux in said gap, a magnetizable rotor disposed in said gap adjacent one of said poles to roll relative thereto when attracted thereby and in engagement therewith, said rotor being movable towards said other pole for attraction thereby, means for biasing said rotor away from said other pole so as to cause unidirectional rotation of said rotor when said coil is energized, a contact-controlling armature movably arranged for attraction by said structure when said coil is energized, means for latching said armature against motion under said attraction a toggle joint mechanism for releasing said latch, transmission means disposed between said rotor and said mechanism for actuating the latter in opposite directions by subsequent rotations of said rotor, and contacts actuated by said mechanism for controlling said coil so as to stop said rotor upon each actuation of said mechanism.

11. A timing relay comprising, in combination, a magnetic structure having a coil for providing periodic magnetic flux, a rotor associated with said structure so as to rotate by virtue of said flux, a contact controlling armature movably arranged for attraction by said structure, means for latching said armature in its attracted position, and means controlled by said rotor for releasing said latching means upon a given rotation of said rotor.

12. A timing relay comprising, in combination, a magnetic structure having a coil for providing periodic magnetic flux, a rotor associated with said structure so as to rotate by virtue of said flux, a contact controlling armature movably arranged for attraction by said structure and biased toward its unattracted position, means for latching said armature in its attracted position, and a cam mechanism controlled by said rotor for releasing said latching means upon a given rotation of said rotor.

13. A timing device comprising, in combination, a magnetic structure having two poles forming an air gap and containing energizing means for producing periodic magnetic flux in said gap, a magnetizable rotor disposed in said gap adjacent one of said poles to roll relative thereto and being movable towards said other pole for attraction thereby, means for biasing said rotor away from said other pole so as to cause unidirectional rotation of said rotor when said means are energized, a contact controlling armature movably arranged for attraction by said structure, means for latching said armature in its attracted position, and means controlled by said rotor for releasing said latching means upon a given rotation of said rotor.

14. A timing device comprising, in combination, a magnetic structure having two poles forming an air gap and containing energizing means for producing periodic magnetic flux in said gap, a magnetizable rotor disposed in said gap adjacent one of said poles to roll relative thereto and being movable towards said other pole for attraction thereby, means for biasing said rotor away from said other pole so as to cause unidirectional rotation of said rotor when said means are energized, a contact-controlling armature movably arranged for attraction by said structure and biased toward its unattracted position, means for latching said armature in its attracted position, and a snap action mechanism having a cam transmission controlled by said rotor for releasing said latching means upon a given rotation of said rotor.

15. A timing device comprising, in combination, an alternating current magnet, a magnetizable rotor associated with said magnet to rotate unidirectionally when said magnet is energized, a contact controlling magnetizable armature movably connected with said magnet, a latch for locking said armature in a given position, means controlled by said rotor for releasing said latch near the end of the rotary travel of said rotor, a return spring for biasing said releasing means toward a starting position, and adjusting means for displacing said starting position so as to vary the amount of said travel and thereby the timing period of the device.

16. A timing device comprising, in combination, an alternating current magnet, a magnetizable rotor associated with said magnet to rotate unidirectionally when said magnet is energized, a contact controlling magnetizable armature movably connected with said magnet, a latch for locking said armature in a given position, rotatable means controlled by said rotor for releasing said latch near the end of the rotary travel of said rotor, a return spring for biasing said means toward a given angular starting position, and an angularly displaceable stop for adjusting said starting position in accordance with a desired timing period of the device.

GEORGE C. ARMSTRONG.